US007245252B2

(12) United States Patent
Knepper et al.

(10) Patent No.: US 7,245,252 B2
(45) Date of Patent: Jul. 17, 2007

(54) METHOD FOR DETERMINING THE DISTANCE BETWEEN TWO TRANSMITTING AND RECEIVING STATIONS

(75) Inventors: Udo Knepper, Langenargen (DE); Stefan Rau, Langenargen (DE); Thomas Oexle, Markdorf (DE); Rolf Schuler, Salem (DE); Wolfgang Schulter, Meersburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 10/530,912

(22) PCT Filed: Sep. 8, 2003

(86) PCT No.: PCT/DE03/02968

§ 371 (c)(1),
(2), (4) Date: Apr. 8, 2005

(87) PCT Pub. No.: WO2004/036241

PCT Pub. Date: Apr. 29, 2004

(65) Prior Publication Data

US 2006/0049975 A1    Mar. 9, 2006

(30) Foreign Application Priority Data

Oct. 12, 2002   (DE)   ................................ 102 47 713

(51) Int. Cl.
*G01S 13/08*  (2006.01)
*G01S 13/76*  (2006.01)
*G01S 11/02*  (2006.01)
*G01S 13/00*  (2006.01)

(52) U.S. Cl. .......................... 342/125; 342/42; 342/44; 342/118; 342/134; 342/137; 342/175; 342/195

(58) Field of Classification Search ............ 342/42–51, 342/70–72, 118, 125, 175, 195, 126–145; 307/9.1, 10.1, 10.2; 340/5.2, 5.6, 5.61, 5.62, 340/10.1, 10.3
See application file for complete search history.

(56) References Cited

U.S. PATENT DOCUMENTS

| | | | | |
|---|---|---|---|---|
| 2,894,258 A | * | 7/1959 | Vantine, Jr. et al. | 342/42 |
| 3,051,946 A | * | 8/1962 | Straehl | 342/47 |
| 3,321,757 A | * | 5/1967 | Crow et al. | 342/47 |
| 3,611,379 A | * | 10/1971 | Deckett | 342/125 |
| 3,680,097 A | * | 7/1972 | Huntsinger | 342/47 |

(Continued)

FOREIGN PATENT DOCUMENTS

DE    199 26 234    12/2000

(Continued)

*Primary Examiner*—Bernarr E. Gregory
(74) *Attorney, Agent, or Firm*—W. F. Fasse; W. G. Fasse (57) ABSTRACT

In a method for determining the distance between two transmitting and receiving stations, a transmission signal is generated in each station and is transmitted as a series of microwave pulses having a predefined pulse repetition frequency to the other respective station. The coincidence of pulses of the transmission signal sent by the respective station and the signal received by the station is detected in each station as a coincidence event, and the number of pulses transmitted and received by the respective station at the time of the coincidence event is determined. The distance between the stations is then calculated on the basis of the number of the determined pulses.

14 Claims, 3 Drawing Sheets

U.S. PATENT DOCUMENTS

| | | | | |
|---|---|---|---|---|
| 3,713,149 | A | * | 1/1973 | Bruner et al. ............... 342/125 |
| 3,781,888 | A | * | 12/1973 | Bail ........................... 342/47 |
| 3,858,211 | A | * | 12/1974 | Litchford .................... 342/125 |
| 3,870,993 | A | * | 3/1975 | Biagi et al. .................... 342/47 |
| 3,918,056 | A | * | 11/1975 | Merrick ....................... 342/46 |
| RE29,260 | E | * | 6/1977 | Litchford .................... 342/125 |
| 4,293,857 | A | * | 10/1981 | Baldwin ...................... 342/47 |
| 4,455,556 | A | * | 6/1984 | Koshio et al. ................ 342/47 |
| 6,803,851 | B1 | | 10/2004 | Kramer et al. |
| 2003/0117259 | A1 | | 6/2003 | Haas et al. |

FOREIGN PATENT DOCUMENTS

DE          100 19 277      11/2001

* cited by examiner

METHOD FOR DETERMINING THE DISTANCE BETWEEN TWO TRANSMITTING AND RECEIVING STATIONS

FIELD OF THE INVENTION

The invention relates to a method for determining the distance between two transmitting and receiving stations.

BACKGROUND INFORMATION

A method of this type is known for example from DE 100 19 277 A1. In this method a radio link is established for transmitting data between an electronic key module to be carried by and on the user and an evaluation unit provided in a motor vehicle, in order to identify the key module based on an identification number stored in the key module, and to release, if necessary, the motor vehicle for use. The radio link is established here via a transmitting and receiving station provided in the key module and in the evaluation unit. To prevent the radio link from being extended via relay stations and to release the motor vehicle in this way without being noticed by the authorized user, the distance between the key module and the evaluation unit is determined and the release of the motor vehicle is prevented, if the key module is not within the immediate vicinity of the evaluation unit. In this case, determination of the distance is based on an evaluation of the signal running time of the signals transmitted via the radio link.

SUMMARY OF THE INVENTION

It is the object of the invention to indicate a method for determining the distance between two transmitting and receiving stations, which can be implemented at low expenditure and which enables measurement of any distances with high resolution.

In accordance with the invention the distance between two transmitting and receiving stations is determined by measuring the signal running time of transmission signals generated in the transmitting and receiving stations and transmitted to the respective other transmitting and receiving station. The transmission signals are respectively generated as a series of microwave pulses having a predefined pulse repetition frequency, which frequencies vary according to a predefined differential frequency value which is preferably small in relation to the pulse repetition frequencies. Furthermore, the coincidence of pulses of the transmission signal sent by the respective transmitting and receiving station and the signal thus received is detected in each transmitting and receiving station as a coincidence event, and for each transmitting and receiving station two numbers of pulses allocated to the respective transmitting and receiving station are determined, which as a transmission pulse number and as a received pulse number represent the number of pulses of the transmission signal sent by the respective transmitting and receiving station and the signal thus received at the time of the coincidence event. The signal running time of the transmission signals and the distance between the transmitting and receiving stations is then calculated on the basis of the determined numbers of pulses.

Preferably, for each transmitting and receiving station a time interval, corresponding to the distance of time between the first pulse transmitted from the respective transmitting and receiving station and the first pulse received from the same transmitting and receiving station, is determined from the numbers of pulses determined for the respective transmitting and receiving station and the distance between the transmitting and receiving stations is calculated by summation of the determined time intervals.

Preferably, a range measured value is calculated as a measure of the distance between the transmitting and receiving stations as per the equation $$x = ((m(i)-p(j)) \cdot g - ((n(i)-q(j)) \cdot h,$$

x representing the range measured value, g and h representing the periods, scaled to a reference time, of the transmission signal transmitted from the one or the other transmitting and receiving station, i and j representing the counting variables for the number of coincidence events determined in the one or the other transmitting and receiving stations, m(i) and n(i) representing the transmission pulse number and received pulse number allocated to the one transmitting and receiving station at the point in time of the $i^{th}$ coincidence event and q(j) and p(j) representing the transmission pulse number and received pulse number allocated to the other transmitting and receiving station at the point in time of the $j^{th}$ coincidence event.

In a preferred further development of the method the numbers of pulses determined for the one transmitting and receiving station are transmitted to the other transmitting and receiving station by modulation, preferably by phase modulation, of the transmission signal generated in the one transmitting and receiving station. The distance between the two transmitting and receiving stations is then calculated at this place from the numbers of pulses.

Preferably, the numbers of pulses are determined by counting the pulses of the respective transmitting and receiving station.

In a preferred embodiment of the method, however, only the pulses of the transmission signals generated in the transmitting and receiving stations are counted and provided as transmission pulse counter states. For the one transmitting and receiving station the transmission pulse number and received pulse number is determined by choosing a pulse from the transmission signal generated in the other transmitting and receiving station, which pulse corresponds to a certain transmission pulse counter state, this chosen pulse being shifted in time or being suppressed for instance by a phase modulation and by testing, whether subsequently in the one transmitting and receiving station the next coincidence event appears at an expected point in time. If at the expected point in time there is no coincidence event, as it has been suppressed or shifted in time due to the phase modulation of the chosen pulse, the transmission pulse counter state determined in the transmitting and receiving station at the expected point in time is allocated to this transmitting and receiving station as a transmission pulse number and the transmission pulse counter state of the chosen pulse is allocated as a received pulse number. In other respects the method steps are repeated with new chosen pulses until a coincidence event fails to appear at an expected point in time also after phase modulation of the chosen pulse.

Preferably, the received pulse numbers for both transmitting and receiving stations are determined similarly.

Preferably, for determining the points of coincidence in each transmitting and receiving station the transmission signal generated in the respective transmitting and receiving station is converted with the transmission signal received by this station by mixing into an intermediate frequency signal and by subsequent filtering, amplification and envelope demodulation into a pulsed evaluation signal. The pulses of the evaluation signals mark the points in time of the coincidence events.

The substantial advantage of the method according to the invention is that it has a large measuring range and all the same enables a high-resolution measurement.

The method according to the invention is particularly suitable for use in a keyless locking system for motor vehicles. With a locking system of this type a base station is provided in the motor vehicle as an evaluation unit, which communicates with portable key modules via a radio link. The radio link is established via transmitting and receiving stations, which are provided in the base station and in the key modules. The radio link can be established without being noticed by the user for example by operating a door handle. Data is exchanged via the radio link, in particular identification numbers—advantageously in coded form—stored in the key modules are transmitted to the base station. The base station permits to gain access to the motor vehicle, if it recognizes on the basis of the identification number of a key module that an authorization to gain access is allocated to this key module, and if the key module is with in a certain distance to the base station. This distance is determined in accordance to the method according to the invention. Based on the high resolution it is furthermore possible to ascertain whether the key module is inside or outside the motor vehicle. Therefore, locking of the motor vehicle can be prevented, if the key module is inside the motor vehicle.

By taking into consideration the distance between the base station and the key module, security of the locking system is enhanced, since access to the motor vehicle is prevented also with a correct identification number, if the distance between the key module and the base station exceeds a certain value. Thus, unauthorized persons are not able to obtain access to the motor vehicle without being noticed by the authorized user, by establishing via relay stations a radio link between the key module and the base station.

BRIEF DESCRIPTION OF THE DRAWINGS

Hereinafter the invention is further explained by the examples of embodiment taken in conjunction with the drawings.

DETAILED DESCRIPTION OF AN EXAMPLE EMBODIMENT OF THE INVENTION

Figure 1:
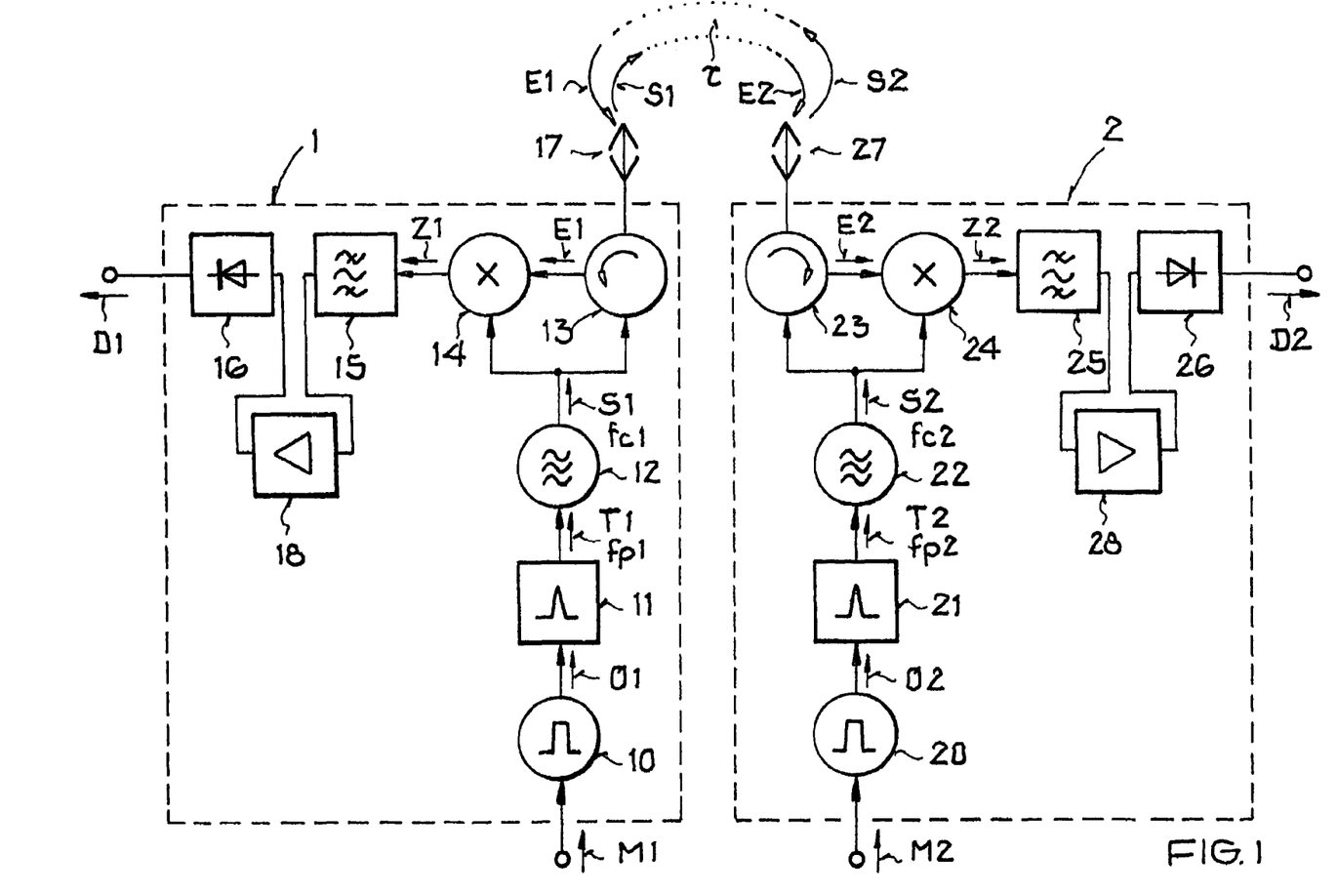
FIG. 1 shows a block diagram with two transmitting and receiving stations for carrying out the method according to the invention.

In accordance with FIG. 1 the two transmitting and receiving stations 1 and 2 are embodied identically. They are a component of a keyless locking system for motor vehicles, the first transmitting and receiving station 1 being part of an evaluation unit provided in the motor vehicle and the second transmitting and receiving station 2 being part of a portable key module. Between the transmitting and receiving stations 1, 2 data are exchanged, to identify the key module based on an identification number stored in the key module and to release the motor vehicle, if necessary, for use.

The first transmitting and receiving station 1 comprises a highly stable oscillator 10 with frequency modulation capability, a pulse chopper 11, a microwave oscillator 12, a coupler 13, a mixer 14, an IF-filter 15, an IF-amplifier 18, an envelope demodulator 16 and a transmitting and receiving antenna 17. Accordingly, the second transmitting and receiving station 2 also comprises a highly stable oscillator 20 with frequency modulation capability, a pulse chopper 21, a microwave oscillator 22, a coupler 23, a mixer 24, an IF-filter 25, an IF-amplifier 28, an envelope demodulator 26 and a transmitting and receiving antenna 27.

The transmitting and receiving stations 1 and 2 are activated by an alarm process and operate simultaneously.

In this connection the oscillator 10 with modulation capability generates in the first transmitting and receiving station 1 an oscillator signal O1, which can be modulated in phase, as an indicator of a control signal M1, which signal O1 is supplied to the pulse chopper 11, which generates out of it a trigger signal T1 with small pulses, which pulse distance or pulse repetition frequency fp1 is determined by the oscillation frequency of the oscillator signal O1. The trigger signal T1 is supplied to the microwave oscillator 12, which in response to the pulses of the trigger signal T1 generates a microwave pulse with several periods of the carrier frequency fc1 of the oscillator 12. The microwave oscillator 12 thus releases a series of microwave pulses as a first transmission signal S1, which is supplied via the coupler 13 to the transmitting and receiving antenna 17 and to the mixer 14.

Analogously, the oscillator 20 with modulation capability also generates in the second transmitting and receiving station 2 an oscillator signal O2, which can be modulated in phase, as an indicator of a control signal M2, which signal O2 is supplied to the pulse chopper 21, which also generates out of it a trigger signal T2 with small impulses, which pulse repetition frequency fp2 is determined by the oscillation frequency of the oscillator signal O2. The trigger signal T2 is supplied to the microwave oscillator 22, which in response to the pulses of the trigger signal T2 generates a microwave pulse with several periods of the carrier frequency fc2 of the oscillator 22. The microwave oscillator 22 thus releases a series of microwave pulses as a second transmission signal S2, which is supplied via the coupler 23 to the transmitting and receiving antenna 27 and to the mixer 24.

Then, via the transmitting and receiving antennas 17 and 27 the first and the second transmission signal S1 and S2 are transmitted to the second and first transmitting and receiving station 2 and 1 and are received there as a second and first received signal E2 and E1 via the transmitting and receiving antennas 27 and 17 after a time lag of a signal running time τ.

In the first transmitting and receiving station 1 the first received signal E1 is brought together in the mixer 14 with the first transmission signal S1 to an intermediate frequency signal Z1, from which by filtering in the IF-filter 15, amplification in the IF-amplifier 18 and subsequent demodulation in the envelope demodulator 16 a first evaluation signal D1 is generated. Accordingly, in the second transmitting and receiving station 2 the second received signal E2 is brought together in the mixer 24 with the second transmission signal S2 to an intermediate frequency signal Z2, from which by filtering in the IF-filter 25, amplification in the IF-amplifier 28 and subsequent demodulation in the envelope demodulator 26 a second evaluation signal D2 is generated.

The signal running time τ is the time the transmission signals S1, S2 require to get from one transmitting and receiving station to the other one. Based on the fixed propagation speed of electromagnetic waves it is a measure for the searched distance between the two transmitting and receiving stations 1, 2.

The carrier frequencies fc1, fc2 of the transmission signals S1, S2 are identical and are, for example, in the range of several GHz. However, for the said carrier frequencies it is not much demanded with regard to their accuracy and frequency stability.

The width of the pulses of the trigger signals T1, T2, is in the range of approx. 1 ns and the pulse repetition frequencies fp1, fp2 of the transmission signals S1, S2 are in the range of, for example, several MHz. It is substantial that the pulse repetition frequencies fp1, fp2 vary by a differential frequency value fd. Here, the accuracy of the measurement depends from the accuracy and frequency stability of the pulse repetition frequencies fp1, fp2.

Figure 2:
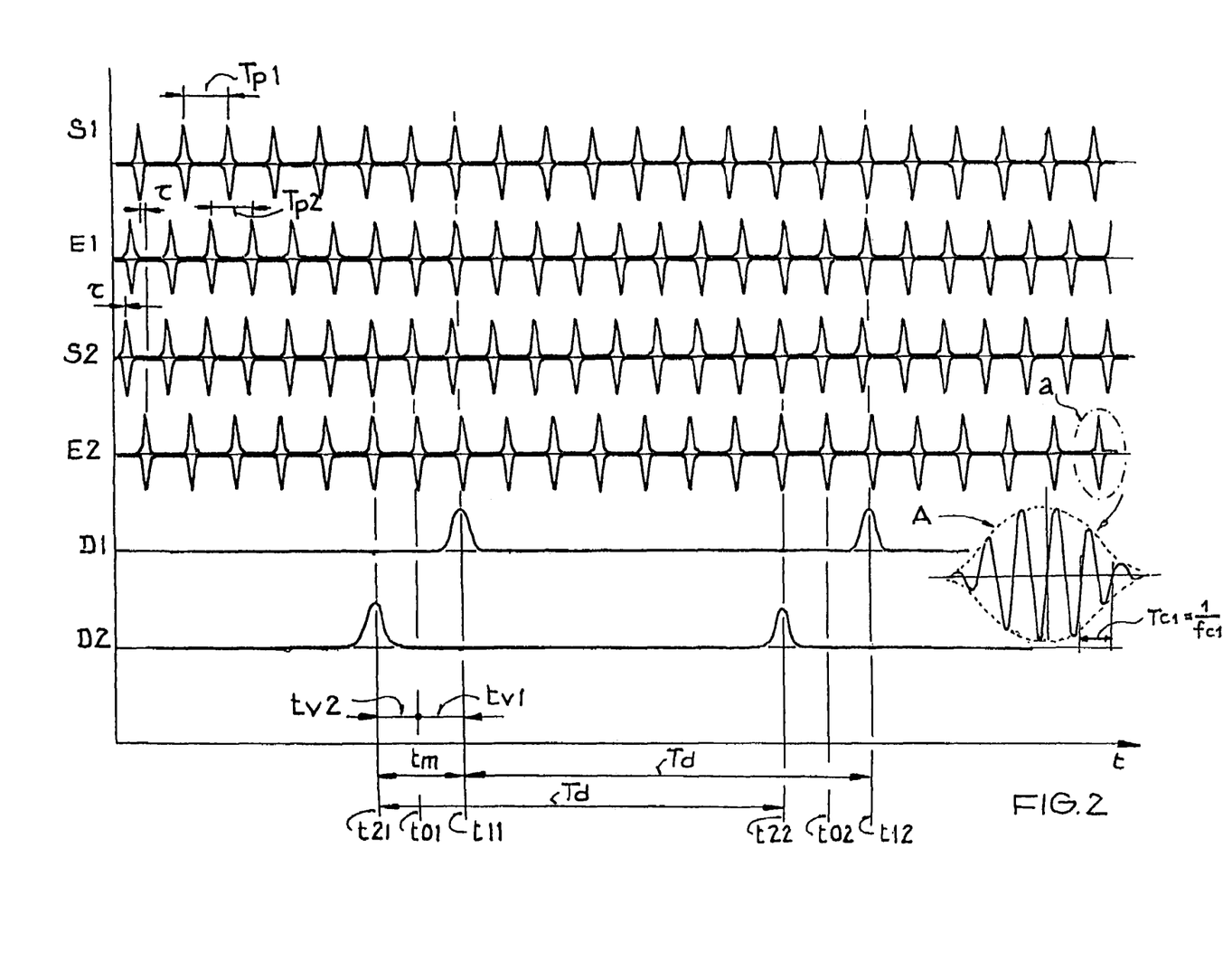
FIGS. 2-3 show timing diagrams of the signals generated and processed in the transmitting and receiving stations.

FIG. 2 shows the time diagrams of the transmission signals S1, S2 transmitted from the transmitting and receiving stations 1, 2, of the received signals E1, E2 received by the transmitting and receiving stations 1, 2, and of the evaluation signals D1, D2 for a signal running time τ=0. As is implicated in the enlarged view A of section a, merely the envelopes of the signals S1, S2, E1, E2 are depicted. These are pulses, which in the case of the first transmission signal S1 and of the second received signal E2 are distanced from each other by a pulse period Tp1 and in the case of the second transmission signal S2 and of the first received signal E1 are distanced from each other by a pulse period Tp2. The pulse periods Tp1, Tp2 correspond to the reciprocal value of the pulse repetition frequencies fp1 and fp2 of the respective signal.

The mixture in the mixers 14, 15 corresponds to a scanning of the first and second received signal E1 and E2 with the first and second transmission signal S1 and S2. The differential frequency value fd is chosen to be such small that this is a sub-scanning.

The resulting evaluation signals D1, D2 are also pulsed signals, of which the pulses appear periodically in the same pulse distance Td. For the pulse distance Td it applies that Td=1/fd, fd representing the differential frequency value, by which the pulse repetition frequencies fp1, fp2 vary. The pulses of the first evaluation signal D1 appear at points in time t11, t12, at which pulses of the first transmission signal S1 and of the first received signal E1 coincide. Said points in time thus each mark a coincidence event and are referred to hereinafter as first points of coincidence. Accordingly, the pulses of the second evaluation signal D2 appear at points in time t21, t22, at which pulses of the second transmission signal S2 and of the second received signal E2 coincide. Said points in time also each mark a coincidence event and are referred to hereinafter as second points of coincidence. In the figure also points in time t01, t02 are shown, at which the pulses of the two transmission signals S1, S2 coincide in time. These points in time are also distanced from each other by the pulse distance Td.

The pulses of the two evaluation signals D1, D2 are offset in relation to each other by a time tm=tv1+tv2 which is proportional to the signal running time τ.

Figure 3:
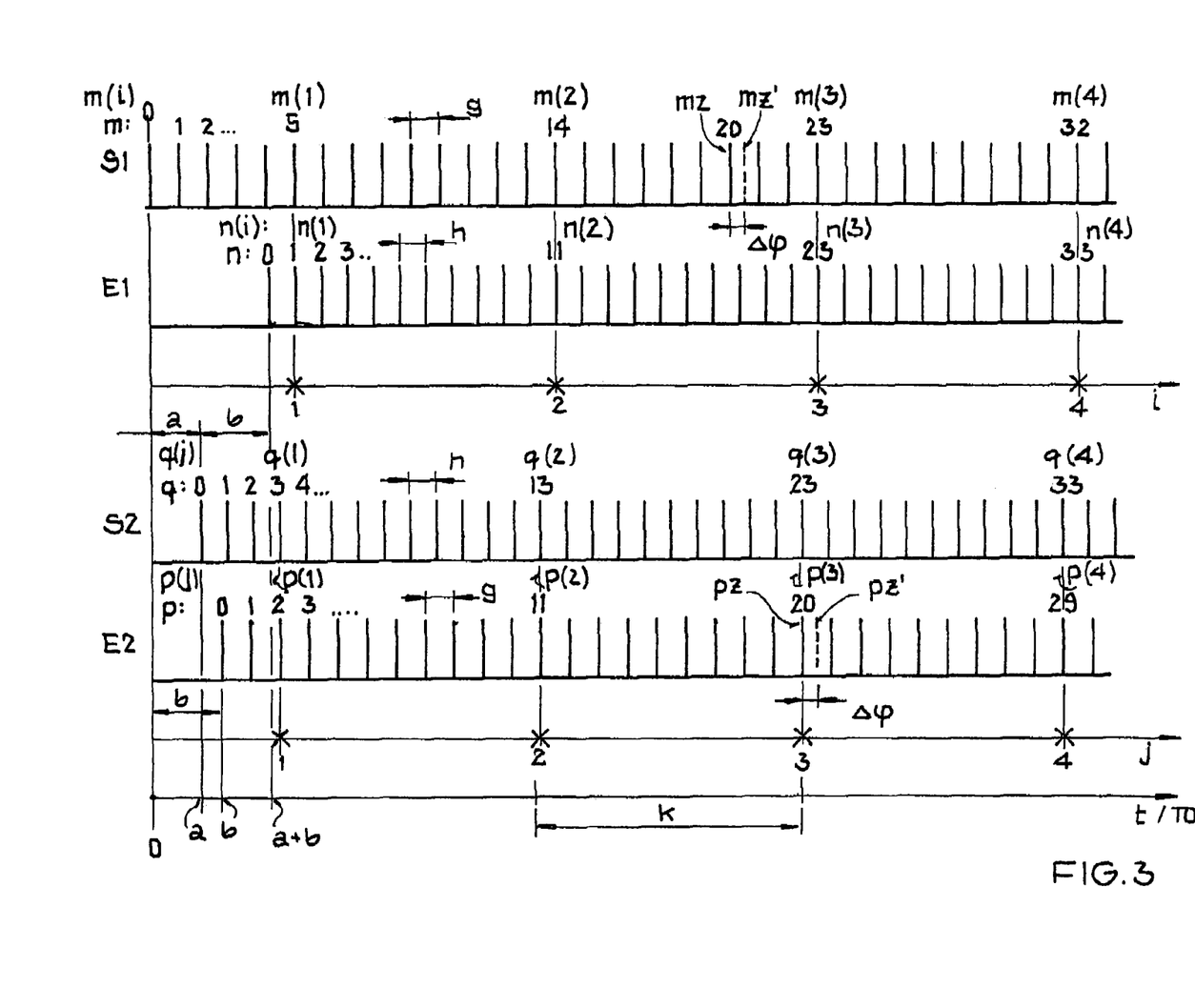

FIG. 3 shows the pulses of the signals S1, S2, E1, E2 in a view with a time axis scaled to a reference time T0. Here, for simplification purposes, the pulses are shown by lines. The reference time T0 corresponds to the measurement resolution of the system. It is calculated from the pulse repetition frequencies fp1, fp2 of the transmission signals S1, S2 as follows:

$$T0 = \frac{|fp1 - fp2|}{fp1 \cdot fp2}.$$

According to the figure, the first transmitting and receiving station 1 starts with generation of a pulse train and transmits it as a first transmission signal S1. The pulses here are distanced from each other by a scaled period g=Tp1/T0. Further, the first transmitting and receiving station 1 alarms the second transmitting and receiving station 2 via a radio link, whereupon the second transmitting and receiving station 2 after a scaled asynchronous time a also starts with generation of a pulse train and transmits it as a second transmission signal S2. The pulses of the second transmission signal S2 are distanced from each other by a period h=Tp2/T0.

The scaled periods g, h are chosen such that they are relatively prime, whole numbers, their values are e.g. g=1001 and h=1000.

The second received signal E2 corresponds to the first transmission signal S1 delayed by a scaled signal running time b=τ/T0 and the first received signal E1 corresponds to the second transmission signal S2 delayed by the equally scaled signal running time b.

In the figure also pulse counter states m, n, p and q are shown. For a simpler view, it was chosen that g=9 and h=10. Here, the pulse counter state m represents as a transmission pulse counter state the number of pulses transmitted from the first transmitting and receiving station 1 at a certain point in time and the pulse counter state n as a received pulse counter state the number of pulses received from the first transmitting and receiving station 1. Analogously, the pulse counter state q represents as a transmission pulse counter state the number of pulses transmitted from the second transmitting and receiving station 2 at a certain point in time and the pulse counter state p as a received pulse counter state the number of pulses received from the second transmitting and receiving station 2.

In the figure, the coincidence events are marked with x on the i- and j-axis. They appear, if pulses of the first transmission signal S1 coincide with pulses of the first received signal E1 or if pulses of the second transmission signal S2 coincide with pulses of the second received signal E2 and according to the remarks regarding FIGS. 1 and 2, they are detected based on the evaluation signals D1, D2. The variables i and j count the coincidence events detected in the first transmitting and receiving station 1 and in the second transmitting and receiving station 2, respectively. The coincidence events are repeated in both transmitting and receiving stations 1, 2 with the same scaled coincidence period k=g·h.

To each of the coincidence events i detected in the first transmitting and receiving station 1 two numbers of pulses are allocated, a transmission pulse number m(i) and a received pulse number n(i). The transmission pulse number m(i) and the received pulse number n(i) correspond to the transmission pulse counter state m and the received pulse counter state n of the first transmitting and receiving station 1 at the time of the $i^{th}$ coincidence event.

Analogously, to each of the coincidence events j detected in the second transmitting and receiving station 2 two numbers of pulses are allocated, a transmission pulses q(j) and a received pulse number p(j). The transmission pulse number q(j) and the received pulse number p(j) correspond to the transmission pulse counter state q and the received pulse counter state p of the second transmitting and receiving station 2 at the time of the $j^{th}$ coincidence event.

Determination of the distance between the transmitting and receiving stations 1, 2 is based on determination of the scaled signal running time b, which on its part is based on summation of two time intervals a+b, b−a, the one time interval a+b corresponding to the distance of time between the first pulse transmitted from the first transmitting and receiving station 1 and the first pulse received by the first transmitting and receiving station 1 and the other time interval b−a corresponding to the distance of time between the first pulse transmitted from the second transmitting and receiving station 2 and the first pulse received by the second transmitting and receiving station 2. These time intervals a+b, a−b can be determined in easy manner from the numbers of pulses m(i), n(i), q(j), p(j) and from the scaled periods g, h.

According to the figure for the numbers of pulses m(i), n(i), allocated to a coincidence event i, of the first transmitting and receiving station 1 the relation $$m(i) \cdot g = a + b + n(i) \cdot h$$

applies and for the numbers of pulses q(j), p(j), allocated to a coincidence event j, of the second transmitting and receiving station 2 the relation $$a + q(j) \cdot h = b + p(j) \cdot g$$

applies.

Thus, the time intervals a+b, b−a result in $$a+b = m(i) \cdot g - n(i) \cdot h$$

$$b-a = +q(j) \cdot h - p(j) \cdot g.$$

By summation of these equations a range measured value x, which is proportional to the scaled signal running time b, is obtained as a measure of the distance between the transmitting and receiving stations 1,2. For the range measured value x it applies:

$$x = 2b = ((m(i)-p(j)) \cdot g - ((n(i)-q(j)) \cdot h.$$

The same result is also achieved, if counting of the pulses does not start with 0, as is shown in the figure, but with 1 or another digit.

The signal running time $\tau$ of the transmission signals S1, S2 as per the equation $$\tau = \frac{d}{c0}$$

is proportional to the distance d between the transmitting and receiving stations 1, 2 and is inversely proportional to the velocity of light c0. Then, with b=$\tau$/T0 from the range measured value x the searched distance d can be calculated as per equation $$d = \frac{1}{2} \cdot x \cdot c0 \cdot T0.$$

If the numbers of pulses q(j) and p(j) determined in the second transmitting and receiving station 2 are transmitted to the first transmitting and receiving station 1, for example via a radio link or by modulation of the second transmission signal S2, all numbers of pulses m(i), n(i), q(j), p(j) required for calculating the range measured value x are available in the first transmitting and receiving station 1. The range measured value x can then be determined offhand in the first transmitting and receiving station 1.

With the above described method the transmission pulse numbers m(i), q(j) and the received pulse numbers n(i), p(j) can be determined by counting the pulses of the respective signal S1, S2, E1, E2.

However, it is also conceivable to determine merely the transmission pulse numbers m(i), q(j) by counting and the received pulse numbers n(i), p(j) indirectly by phase modulation of the transmission signals S1, S2 and from the transmission pulse counter states m, q of the transmission signals S1, S2.

For instance, for determining the received pulse number p(j) of the second transmitting and receiving station 2, in the first transmitting and receiving station 1 a pulse mz is chosen from the first transmission signal S1—in the shown example this is the pulse with the transmission pulse counter state m=20—and is marked by phase modulation. The chosen pulse mz is thus shifted by the phase value $\Delta\phi$ into the position mz' shown in dashed lines or is suppressed. The latter corresponds to a phase shifting of about 360°. As a consequence of the phase shifting, in the second received signal E2 the pulse pz corresponding to the same counter state is shifted by the phase value $\Delta\phi$ into the position pz' shown in dashed lines.

If the pulse pz, as is shown in the figure, is in a position, which corresponds to a coincidence event, its shifting to the position pz' results in that the coincidence event fails to appear.

If, however, the pulse pz is in a position, which does not correspond to a coincidence event, its shifting does not affect the coincidence events. The coincidence events continue to be repeated with the scaled coincidence period k.

For determination of the received pulse number p(j) of the second transmitting and receiving station 2, it is now tested whether after shifting of the chosen pulse mz a coincidence event fails to appear in the second transmitting and receiving station 2. This absence of a coincidence event is recognized, as the coincidence events as expected are repeated with the scaled coincidence period k. If now it has been recognized that at a certain point in time expected coincidence events fail to appear, the transmission pulse counter state q of the second transmission signal S2 determined by counting at this point in time is noted as a transmission pulse number q(j) and the counter state of the chosen pulse mz is noted as a received pulse number p(j).

With the case shown in the figure the absence of the coincidence event is recognized with the number j=3, the related transmission pulse number q(3) is set to the value q(3)=23, and the related received pulse number p(3) is set to the values p(3)=20, i.e. to the counter state of the pulse mz. The received pulse number p(3) is thus determined indirectly by counting the pulses of the first transmission signal S1.

If shifting of the chosen pulse does not affect the coincidence events, the method steps are repeated with new chosen pulses until a pulse is selected which shifting causes the expected coincidence event to fail to appear.

For the first transmitting and receiving station 1 the transmission pulse number m(i) and the related received pulse number n(i) can be determined similarly by selection and phase modulation of a pulse from the second transmission signal S2.

If certain pulses of one of the transmission signals S1, S2 are shifted by phase modulation, the distance between the coincidence events changes in that transmitting and receiving station 1, 2 which receives the concerned transmission signal S1 and S2, resp. A phase modulation in the one transmitting and receiving station 1 or 2 thus can be detected in the other transmitting and receiving station 2 or 1. Consequently, the phase modulation enables a transfer of data between the transmitting and receiving stations 1, 2.

The substantial advantage of the described methods is that they have a high region of unambiguousness but still permit high-resolution measurement.

The measurement is unambiguous, if the scaled signal running time b is smaller than the scaled coincidence period k, i.e. if for the signal running time $\tau$ it applies $$\tau < T\max = g \cdot h \cdot T0.$$

Tmax represents the limit of the region of unambiguousness, i.e. the maximum measuring range. If the pulse repetition frequencies fp1 and fp2 are chosen to be equal to 50 MHz or 50,05 MHz, for the reference time T0 and the maximum measuring range Tmax the values T0=20 ps and Tmax=20,02 µs are obtained, i.e. signal running times $\tau$ of up to 20,0 µs with a resolution of 20 ps can be measured. In the local area this corresponds to a measuring range of about 6 km with a resolution of 6 mm.

The invention claimed is:

1. A method for determining the distance between two transmitting and receiving stations (1, 2), characterized in that in each transmitting and receiving station (1, 2) a transmission signal (S1, S2) is generated and is transmitted as a series of microwave pulses having a predefined pulse repetition frequency (fp1, fp2) to the respective other transmitting and receiving station (2, 1) and is received thereby in the form of a received signal (E2, E1), said pulse repetition frequencies (fp1, fp2) of the transmission signals (S1, S2) varying according to a predefined differential frequency value (fd), in each transmitting and receiving station (1, 2) the coincidence of pulses of the transmission signal (S1, S2) sent by the respective transmitting and receiving station (1, 2) and the received signal (E1, E2) is detected as a coincidence event, for each transmitting and receiving station (1, 2) two numbers of pulses (m(i), n(i), p(j), q(j)) allocated to the respective transmitting and receiving station (1, 2) are determined, which as a transmission pulse number (m(i), q(j)) and as a received pulse number (n(i), p(j)) represent the number of the pulses transmitted and received by the respective transmitting and receiving station (1, 2) at the point in time of a coincidence event, the distance between the transmitting and receiving stations (1, 2) is calculated from the numbers of pulses (m(i), n(i), p(j), q(j)).

2. A method according to claim 1, characterized in that for each transmitting and receiving station (1, 2) the time interval (a+b, b−a) between the first pulse transmitted from the respective transmitting and receiving station (1, 2) and the first pulse received by the same transmitting and receiving station (1, 2) is determined from the numbers of pulses (m(i), n(i), p(j), q(j)) determined for the respective transmitting and receiving station (1, 2) and in that the distance between the transmitting and receiving stations (1, 2) is calculated by summation of the determined time intervals (a+b, b−a).

3. A method according to claim 1, characterized in that a range measured value (x) is calculated as a measure of the distance between the transmitting and receiving stations (1, 2) as per the equation $$x = ((m(i)-p(j)) \cdot g - ((n(i)-q(j)) \cdot h,$$

wherein g and h represent the periods (Tp1, Tp2), scaled to a reference time (T0), of the transmission signal (S1, S2) transmitted from the one or the other transmitting and receiving station (1, 2), i and j represent counting variables for the number of coincidence events detected at a certain point in time in the one or the other transmitting and receiving station (1, 2), m(i) and n(i) represent the transmission pulse number and received pulse number allocated to the one transmitting and receiving station (1) at the point in time of the $i^{th}$ coincidence event and q(j) and p(j) represent the transmission pulse number and received pulse number allocated to the other transmitting and receiving station (2) at the point in time of the $j^{th}$ coincidence event.

4. A method according to claim 1, characterized in that the numbers of pulses (p(j), q(j)) determined for the one transmitting and receiving station (2) are transmitted to the other transmitting and receiving station (1) by modulation of the transmission signal (S2) generated in the one transmitting and receiving station (2) and in that the distance between the transmitting and receiving stations (1, 2) is calculated in this transmitting and receiving station (1).

5. A method according to claim 4, characterized in that the transmission signal (S2) is modulated by phase modulation.

6. A method according to claim 1, characterized in that the numbers of pulses (m(i), n(i), q(j), p(j)) are determined by counting the pulses transmitted and received by the respective transmitting and receiving station (1, 2).

7. A method according to claim 1, characterized in that, in each transmitting and receiving station (1, 2) the pulses transmitted are counted to determine the transmission pulse counter states (m, n).

8. A method according to claim 7, characterized in that the transmission pulse number (q(j)) and received pulse number (p(j)) are determined for the one transmitting and receiving station (2), by choosing a pulse (mz), which corresponds to a certain transmission pulse counter state (m), from the transmission signal (S1) generated in the other transmitting and receiving station (1), and by shifting this pulse (mz) in time or suppressing it, by testing, whether in the one transmitting and receiving station (2) the next coincidence event appears at an expected point in time, and by allocating as a transmission pulse number (q(3)) the transmission pulse counter state (q) to the one transmitting and receiving station (2) determined at the expected point in time in it and as a received pulse number (p(3)) the transmission a pulse counter state (m) of the chosen pulse (mZ), if at the expected point in time there is no coincidence event.

9. A method according to claim 8, characterized in that the method steps in the case of a coincidence event appearing at the point in time to be expected are repeated with new chosen pulses until a coincidence event fails to appear at an expected point in time.

10. A method according to claim 8, characterized in that the transmission pulse numbers (n(i), p(j)) are similarly determined for both transmitting and receiving stations (1, 2).

11. A method according to claim 1, characterized in that the differential frequency value (fd) is substantially smaller than the pulse repetition frequencies (fp1, fp2) of the transmission signals (S1, S2).

12. A method according to claim 1, characterized in that between the transmitting and receiving stations (1, 2) data are transferred by phase modulation of the transmission signals (S1, S2).

13. A method according to claim 1, characterized in that in the transmitting and receiving stations (1, 2) the transmission signal (S1, S2) generated in the respective transmitting and receiving station (1, 2) is converted with the received signal (E1, E2) received by this station by mixing into an intermediate frequency signal (Z1, Z2), and by converting said intermediate frequency signal (Z1, Z2) by filtering and envelope demodulation into a pulsed evaluation signal (D1, D2) and by determining the position in time of the pulses of the evaluation signal (D1, D2) as points in time (t11, t12, t21, t22), at which a coincidence event appears.

14. Use of the method according to claim 1, in a keyless locking system for motor vehicles for determining the distance between a transmitting and receiving station provided in the motor vehicle and a further transmitting and receiving station provided in a key module.

\* \* \* \* \*